United States Patent
Ludovico et al.

(10) Patent No.: US 7,840,219 B2
(45) Date of Patent: Nov. 23, 2010

(54) RADIO STATION SITE IN A TELECOMMUNICATIONS NETWORK

(75) Inventors: Michele Ludovico, Turin (IT); Giuseppe Minerva, Turin (IT); Daniela Mirra, Turin (IT); Massimiliano Panico, Turin (IT); Massimiliano Petra, Turin (IT); Emanuele Silio, Turin (IT)

(73) Assignee: Telecom Italia S.p.A., Milan (IT)

( * ) Notice: Subject to any disclaimer, the term of this patent is extended or adjusted under 35 U.S.C. 154(b) by 322 days.

(21) Appl. No.: 10/589,432

(22) PCT Filed: Feb. 27, 2004

(86) PCT No.: PCT/IT2004/000094
§ 371 (c)(1),
(2), (4) Date: Aug. 15, 2006

(87) PCT Pub. No.: WO2005/084056
PCT Pub. Date: Sep. 9, 2005

(65) Prior Publication Data
US 2008/0037497 A1    Feb. 14, 2008

(51) Int. Cl.
*H04W 40/00* (2009.01)
*H04W 4/00* (2009.01)
(52) U.S. Cl. .................. 455/446; 455/448; 455/449; 370/328
(58) Field of Classification Search ............ 455/446, 455/448, 449, 552, 553; 370/328
See application file for complete search history.

(56) References Cited

U.S. PATENT DOCUMENTS

| 6,094,580 | A | 7/2000 | Yu et al. |
| 6,539,221 | B1* | 3/2003 | Vasudevan et al. ........ 455/423 |
| 6,549,781 | B1* | 4/2003 | O'Byrne et al. ............ 455/446 |
| 2003/0087641 | A1* | 5/2003 | Gustafsson ................ 455/446 |
| 2003/0123425 | A1* | 7/2003 | Walton et al. .............. 370/341 |
| 2004/0127224 | A1* | 7/2004 | Furukawa et al. .......... 455/446 |

OTHER PUBLICATIONS

Pierre, S. et al., "A Tabu Search Approach for Assigning Cells to Switches in Cellular Mobile Networks," Computer Communications, vol. 25, No. 5, pp. 464-477, (2002).

(Continued)

*Primary Examiner*—Dwayne D Bost
*Assistant Examiner*—Michael Mapa
(74) *Attorney, Agent, or Firm*—Finnegan, Henderson, Farabow, Garrett & Dunner, L.L.P.

(57) ABSTRACT

A method for selecting a subset of sites within a set of candidate sites for activating one or more radio stations of a telecommunications network includes building an initial solution of a subset of sites starting from a network configuration having the whole set of active candidate sites; and optimizing the initial solution for activating "inactive" sites and/or deactivating "active" sites, in order to minimize a predetermined cost function for the solution. The steps of building and optimizing the initial solution are adapted to define both solutions that have a geographic coverage area that is greater than a predefined minimum coverage area and to manage an amount of traffic that is greater than a predefined minimum expected traffic value. A processing system and a processing program or group of programs can be executed by the system when pre-arranged for performing the above method.

23 Claims, 5 Drawing Sheets

OTHER PUBLICATIONS

Amaldi, E. et al., "Improved Models and Algorithms for UMTS Radio Planning," VTC Fall 2001, IEEE 54$^{th}$ Vehicular Technology Conference, Proceedings, Atlantic City, NJ, Oct. 7-11, 2001, and IEEE Vehicular Technology Conference, New York, NY, vol. 1 of 4, Oct. 7, 2001, Conference No. 54, pp. 920-924, (2001).

Tutschku, K, "Demand-Based Radio Network Planning of Cellular Mobile Communication Systems," Infocom '98, Seventeenth Annual Joint Conference of the IEEE Computer and Communications Societies, Proceedings, IEEE San Francisco, CA, Mar. 29-Apr. 2, 1998, New York, NY, IEEE, pp. 1054-1061, (1998).

Menolascino, R. et al., "Software Tools for the Optimisation of Resources in Mobile Systems," Storms Project Final Report, pp. 1-27, (Apr. 1999).

Silio, E., "Metodo Automatico per la Pianificazione di una Rete UMTS Mediante Valutazione di un Insieme di Siti Candidati," Graduation Thesis in Politecnico di Torino, Facoltà di Ingegneria dell'Informatzione, pp. I, II, and 86-116, (May 2001).

* cited by examiner

RADIO STATION SITE IN A TELECOMMUNICATIONS NETWORK

CROSS REFERENCE TO RELATED APPLICATION

This application is a national phase application based on PCT/IT2004/000094, filed Feb. 27, 2004, the content of which is incorporated herein by reference.

FIELD OF THE INVENTION

The present invention deals in general with planning and/or designing a telecommunications network such as, for example, a third-generation cellular network, and in particular with selecting a set of physical sites for installing one or more base radio stations.

BACKGROUND ART

The selection of physical sites for installing one or more radio stations, for example base radio stations, and more specifically the optimum selection of a subset of sites from a wider set of candidate sites is a significantly relevant aspect in the field of planning, designing and developing networks, in particular third-generation cellular networks (UMTS), both for network operators that can already be found on the market, and for those operators that enter the sector for the first time.

Problems of such nature, in fact, deal both with pre-existing operators owning a network, for example of the GSM type, of which the sites available as regards installation of new radio stations, for example third-generation ones, will be partly or wholly re-used, and with new operators that will have to comply with the need of establishing how many cells have to be placed in the territory and where they have to be physically located. Obviously, even though the present invention preferably refers to the cellular network environment, it goes without saying that the invention can be used also in the wider context of telecommunications networks, particularly, for example, in the fixed networks context that provides for a designing and/or planning that requires a site selection for radio apparatuses.

As known, in the initial step of installing a complex system such as, for example, a third-generation mobile network and during the normal evolution (enlargement) of the network itself, aim of the operators is serving a specific geographic area complying with the following requirements, that in some cases are mutually in contrast:

territory electromagnetic coverage;
carrying the traffic volumes offered by the different active network services;
limiting the costs due to apparatuses installation and management.

It is therefore important to efficiently determine the set of base radio stations to be used in order to guarantee required performances and obtain a good network development hypothesis in time (the so-called "roll-out") upon increasing the users and deploying services that are more and more numerous, different and complex.

The prior art where the problem of optimally selecting base radio stations sites has been dealt with comprises United States patent U.S. Pat. No. 6,094,580 assigned to Nortel Networks Corporation, entitled "Method for Optimising Cell-Site Placement", dated 25 Jul. 2000, and the Graduation Thesis prepared in Politecnico of Turin, entitled "Metodo automatico per la pianificazione di una rete UMTS mediante la valutazione di un insieme di siti candidati", Paragraphs 2 and 3 in Chapter 6 and Chapter 7, Emanuele Silio, May 2001.

The method for selecting sites object of patent U.S. Pat. No. 6,094,580 is based on a process structured into two elementary steps in which the following are respectively used:

Linear Programming Operating Research techniques for defining an initial solution; and
an algorithm for refining the solution obtained in the previous step, of a non-recurring type.

The used sites selection criteria depend on considerations based on the degree of obtained coverage or service, and on investment costs.

The cost function used for selecting is associated with a problem of minimum and is composed of two different terms, related to economic cost of activated cells/sites and to the cost, expressed through suitable penalties, of traffic (or alternatively geographic area) not served by the resulting network.

After having defined an initial solution obtained through Linear Programming techniques, a "greedy" algorithm operates in order to activate a subset of cells selected in the previous step. Such algorithm iteratively operates by adding a cell/site to every performed elementary step, till a specific stop condition is verified.

The proposed stop conditions are:

1) the selected cell/site does not satisfy a usefulness criterion expressed in terms of cost of incremental traffic that can be carried in case of activation; such cost is expressed by the relationship:

$$r(s) = \frac{W(s)}{C_S}$$

where:

W(S) is the traffic (in erlang) that can be carried by the cell/site S once activated; and $C_s$ is the cell/site activation cost.

The criterion to be satisfied as regards a new activation is related to the fact that the inactive cell/site, characterised by maximum usefulness r(S), satisfies the relationship:

$$r(s) = \frac{W(s)}{C_S} \geq \frac{\text{Min}_{erlang}}{C_S}$$

where the right-hand term in the inequality expresses the minimum increase of carried erlangs normalised with respect to the cell activation cost, that must be satisfied in order to activate the examined cell.

2) the selected cell/site does not satisfy a usefulness criterion expressed in terms of cost of incremental area that can be covered in case of activation; such cost is expressed by the relationship:

$$r(s) = \frac{A(s)}{C_S}$$

where:

A(s) is the area in square meters that can be covered by the cell/site S once activated; and $C_s$ is the cell/site activation cost.

The criterion to be satisfied for a new activation is related to the fact that the inactive cell/site characterised by maximum usefulness r(S) satisfies the relationship:

$$r(s) = \frac{A(s)}{C_S} \geq \frac{Min_{area}}{C_S}$$

where the right-hand term in the inequality expresses the minimum increase of covered area, normalised with respect to the cell activation cost, that must be satisfied in order to activate the examined cell.

3) the area globally covered by the system satisfies, after activating the new cell/site, the minimum coverage requirement.

The above three criteria are used as a mutual alternative. Therefore, the site selecting algorithm uses a single stop criterion and the final solution exclusively satisfies the used criterion.

The inconveniences of the proposed solution can be summarised as follows:
- multiple admissibility criteria for the solution are not simultaneously used;
- the criterion in item 1) does not guarantee the compliance with a minimum requirement (or constraint) related to total traffic carried by the set of activated cells (different from 100%);
- the criterion in item 2) does not guarantee the compliance with a minimum requirement (or constraint) related to the area covered by the set of activated cells (different from 100%).

It is important to note how the first mentioned inconvenience is particularly relevant, since it is not adequate to use, for example, the globally carried traffic only in order to judge a good solution, without taking into account the total area covered by the considered set of cells. In fact, leaving significantly extended areas, characterised by a scarce offered traffic, uncovered, can be a penalty from the point of view of quality and geographic continuity of services offered to radio-mobile users.

Similar considerations can obviously be made in the completely opposite case in which, as judgement parameter, only the covered area is used, without any type of evaluations related to the traffic actually carried by the system.

The Graduation Thesis "Metodo automatico per la pianificazione di una rete UMTS mediante la valutazione di un insieme di siti candidati" describes a site selecting algorithm based on an approach derived from Operating Search techniques that allows choosing, in order to activate the base radio stations, a subset of sites starting from a wider set of candidates, in which the adopted selection criteria depend on predetermined radio design parameters for third-generation networks.

In more detail, the algorithm operates in order to optimise the resulting coverage depending on parameters such as globally served area, carried traffic and distribution of cell loads $\eta_{cell}$ and soft hand-over loads $\eta_{SHO}$ of activated cells.

The relevant algorithm is based on guide lines of a search methodology called "Taboo Search" and uses a cost function of the multidimensional type for evaluating a solution belonging to the space of solutions (the space of solutions corresponds to the complete set of possible solutions), and elementary cells/sites activation and deactivation moves (actions) that allow exploring the space of solutions to the site selection problem, transforming a solution S1 into a different solution S2. Such algorithm uses, for evaluating the efficiency of a generic solution, a cost function composed of four different terms:

$$F_C = W_1 \cdot A_{NS}^\% + W_2 \cdot T_{NS}^\% + W_3 \cdot S_C + W_4 \cdot S_{SH}$$

where:
$W_1$, $W_2$, $W_3$, $W_4$ represent the weights associated with each function term; and
the first two cost items $A^\%_{NS}$ and $T^\%_{NS}$, respectively related to the remaining uncovered area and to the remaining traffic not carried by the set of selected cells, assume the following form:

$$A_{NS}^\% = \frac{A_{TOT} - \sum_{i=1}^{N_{activecells}} A_i^{service}}{A_{TOT}}$$

$$T_{NS}^\% = \frac{T_{TOT} - \sum_{i=1}^{N_{activecells}} \sum_{j=1}^{S} T_j^{(i)}}{T_{TOT}}$$

wherein:
$N_{activecells}$ is the number of cells being present in the solution;
S is the number of services being taken into account;
$A_{TOT}$ is the area covered by the complete set of candidate cells;
$T_{TOT}$ is the traffic carried by the complete set of candidate cells;
$A_i^{service}$ is the area covered by the i-th activated cell; and
$T_j^{(i)}$ is the traffic, of the j-th type, carried by the i-th activated cell, and
the further cost items $S_C$ and $S_{SH}$ represent an indication of the mean square deviation (or standard deviation) of cell loads $\eta^i_{cell}$ and soft hand-over loads $\eta^i_{SHO}$ of the activated cells, by ideal load and soft hand-over loads.

The shown function does not guarantee the definition of a final solution that globally optimises the network planning in the considered geographic area.

The Applicant deems that the global planning optimisation is fundamentally important for providing the services according to minimum capillarity requirements of network on territory, such fact not being guaranteed by the prior art either due to coverage limits or due to traffic limits.

According to the Applicant, the current prior art therefore has a series of particularly relevant problems related to the impossibility of jointly and efficiently taking into account the design constraints, such as, for example, the minimum geographic area in which the provided services (namely a predetermined volume of traffic) and the minimum traffic to be carried for the set of considered services are guaranteed.

Moreover, the Applicant notes that the prior art as a whole does not take into account a particular constraint about the characteristics of the optimum defined solution, namely the predetermination of compulsorily active cells (namely the cells not subjected to the selection process).

The impossibility of deeming as already active, and therefore locked, particular cells, makes the known methods, and in particular those mentioned as most relevant, unable for preparing the network "roll-out", within which it is mandatory to take into account the set of cells already active in the previous years, in order to develop (enlarge) the network in time.

In the specific context of third-generation mobile networks, a further limit of the mentioned known prior art is given by the definition of a cost function to be minimised, used in the optimisation procedure that does not allow any evaluation of the possible pilot pollution phenomenon (interference from pilot channel).

Like every cellular radio-mobile system, the third-generation UMTS system provides, as known, for common control channels that are broadcast within the whole area of each cell. Such channels transmit mandatory system information for receiver terminals.

Among these, the Common Pilot Channel (CPICH) is a physical channel in down-link (from radio station to terminals) that is used by mobile terminals for network synchronisation. The pilot channel signals operates as "beacon" to point out the existence of a base station to network receiver terminals.

Each cell transmits its own pilot signal at a common frequency; the comparison between signal powers from different pilot channels allows the terminals to recognise the server base station and to manage possible hand-over processes. It is provided that, in particular areas, called macro-diversity areas, a mobile terminal decodes the signal from many antennas, and therefore to exchange information with many Base Radio Stations (SRB).

If a terminal is found in an area in which it receives the pilot signals from a number of cells greater than the maximum number of cells that can be managed by the terminal and with comparable powers, an interference phenomenon results, known as "pilot pollution", that can generate a decrease transmission capability in the area or also the loss of current calls. The phenomenon also implies a higher consumption of internal terminal power due to the increase of processing needs. In fact, in such situation, the mobile terminal continuously changes the set of cells to which it is connected in macro-diversity (the so-called "active set"), because the number of candidate cells to macro-diversity is greater than the maximum number of cells that can be managed by it.

The pilot pollution is therefore an indicator of how many cells in excess are perceived by a radio-mobile terminal when it is connected to a network with respect to its cell managing capability (maximum number of cells to which it can be connected in macro-diversity) and with respect to network parameters.

The evaluation of the pilot pollution phenomenon, related to the system down-link section, is fundamentally important for a good design/planning of a third-generation network, and therefore it must be taken into account in a design/planning context to allow the correct and efficient operation of mobile terminals in the network as designed/planned.

SUMMARY OF THE INVENTION

Object of the invention is proposing a method and a system for optimally selecting a subset of sites within a wider set of candidate sites for the activation of one or more radio stations, that allow obtaining a predetermined radio-electric and service coverage. This object is reached through a method and a system that allow selecting, as admissible solutions, those solutions that together guarantee both a minimum predefined geographic coverage in which the provided services have to be guaranteed, and a minimum predefined traffic value to be carried for the set of considered services.

The invention, in a preferred embodiment thereof, proposes a method and a system for selecting a subset of sites that allow predefining, as further constraint on optimum solution characteristics, the compulsorily active cells/sites in the searched solution.

The invention also proposed a method and a system for selecting a subset of sites that allow taking into account, in a further preferred embodiment, the pilot pollution phenomenon by minimising the global network impact.

In particular, object of the invention are a method and a system for selecting radio stations sites when designing a telecommunications network, whose characteristics are included in the independent claims.

Further objects of the invention are a processing program or group of programs for actuating a selecting method, a telecommunication network planning method and a telecommunications networks as claimed.

Synthetically, a meaningful aspect of the method and system of the invention is represented by the joint use of a design constraint related to the minimum area to be covered, computed with respect to the area guaranteed by the configuration with all active sites, and of a design constraint related to the minimum traffic to be carried, computed with respect to the traffic guaranteed by the configuration with all active sites, in the search of one or more admissible solutions belonging to the space of solutions, evaluated through a cost function.

A further characteristic is the chance of predefining a plurality of sites to be deemed compulsorily active in any defined solution.

In order to take into account the pilot pollution phenomenon and to minimise the network presence, the solution of the invention provides for the use of the cost function enriched by a term pointing out the presence of pilot pollution in the system, in addition to introducing new selection criteria for deactivation candidate cells for pilot pollution reasons.

BRIEF DESCRIPTION OF THE FIGURES

Further advantages and characteristics of the present invention will be better pointed out by the following detailed description, performed with reference to the enclosed drawings, provided as a mere non-limiting example, in which.

DETAILED DESCRIPTION OF THE INVENTION

A sites selecting system according to the invention comprises a computerised workstation of a known type (not shown), or a processing system of the distributed type, having a processing subsystem and peripheral, local or remote, input/output devices, and arranged to process groups or modules of programs stored on disk and accessible on the network. The groups or modules of programs are processing and computation programs that realise the method according to the invention that will be described in detail below. Such workstation or distributed processing system is deemed well known in the art and will not be further described herein since it is per se irrelevant in order to carry out and understand the present invention.

Figure 1:
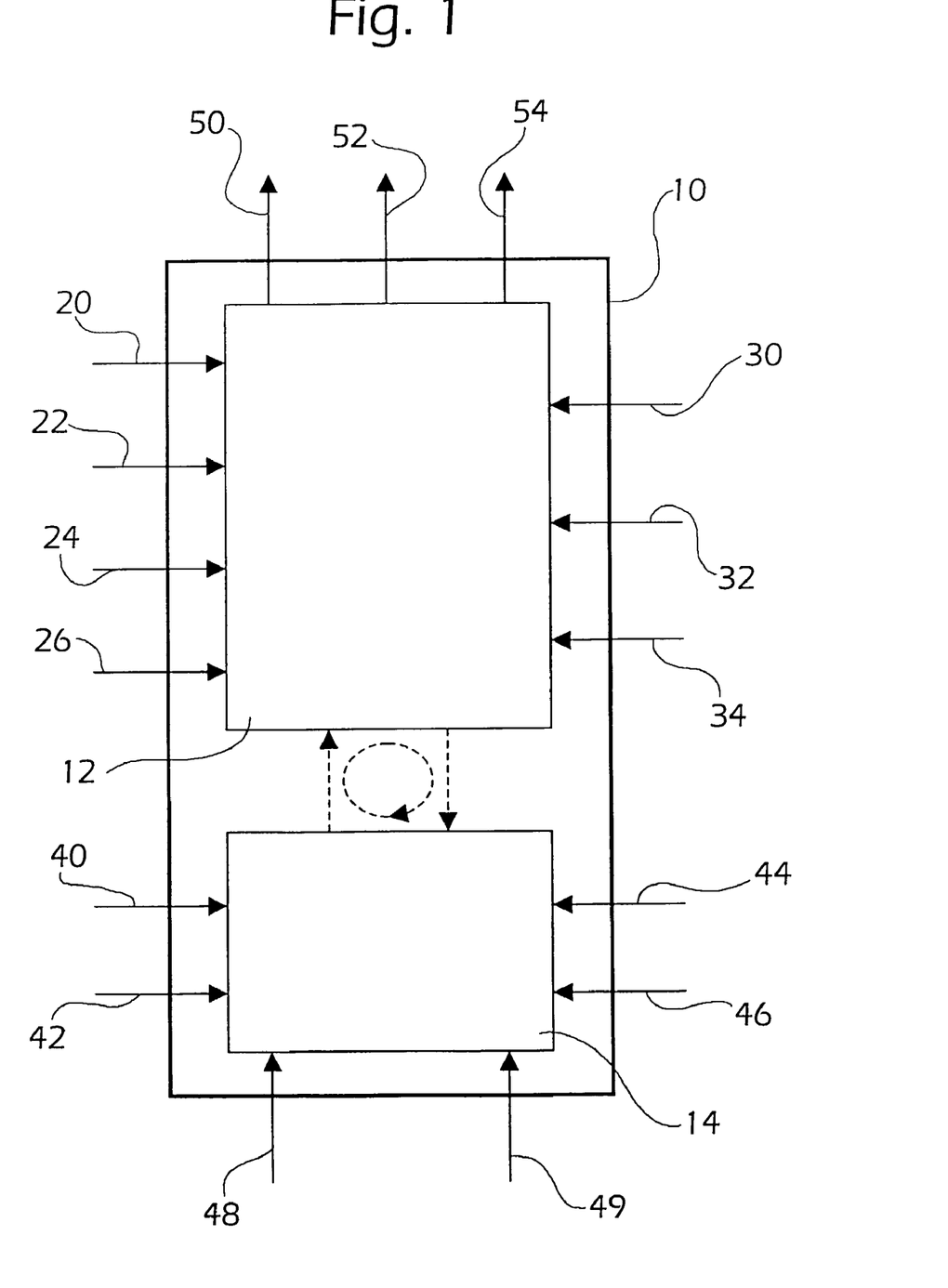
FIG. 1 shows a schematic example of a sites selecting system according to the invention, with particular reference to inputs and outputs.

With reference to FIG. 1, the sites selecting system 10 according to the invention comprises a processing module 12 for executing a sites selecting algorithm and an associated deterministic module 14 for evaluating the performance of the set of cells generated by the selected sites. The selecting method of the invention operates through the recursive interaction between processing module 12 and evaluating module 14.

In the preferred embodiment that provides the implementation of the method for a third-generation network, the following data are input into the processing module 12:

a first design constraint 20 related to the minimum geographic area in which the provided services must be guaranteed, expressed as percentage of the geographic area covered by all the cells (candidate for the activation) in the area;

a second design constraint 22 related to the minimum traffic to be carried for the set of services deemed as percentage of the traffic carried by all the cells (candidate for the activation) in the area;

a relaxation threshold 24 of the constraint 20 on the minimum geographic area to be covered, expressed as percentage, as specified below;

a relaxation threshold 26 of the constraint 22 on the minimum traffic to be carried, expressed as percentage, as specified below;

an ideal allotment value 30 between cell load and soft hand-over load, project objective that represents the allotment of cell resources in dedicated resources for traffic controlled by the cell and dedicated resources for macro-diversity traffic;

a flag 32 pointing out the selection depending on cell or site, that refers to a constraint on optimum solution characteristics; and a list 34 of compulsorily active cells that therefore are not subjected to the selection process.

In the preferred embodiment that provides for the implementation of the method for a third-generation network, the following data are input to the evaluation module 14:

cartography 40 of the area considered by planning, described for example through files stored in a data base that include information such as altimetry, building density and morphology for every territory portion;

traffic distribution 42 in the area considered by planning, described for example through files stored in a data base that include information referred to offered traffic, for every type of service, to every territory portion;

description 44 of candidate cells or sites for activation (namely all cells being present in the considered area) through files containing information related to geographic coordinates, electromagnetic characteristics of used antenna(s), configuration data and family of services supported by every candidate cell or site; and the limit cell load 46, project objective that represents the maximum admissible load value for every cell.

In the preferred embodiment, in order to take into account the pilot pollution phenomenon, the following data are provided, for example, to the evaluation module 14:

width 48 of the macro-diversity window of each cell, expressed in dB, pointing out the maximum possible difference between power received on the cell pilot channel and power received on the pilot channel of a cell in macro-diversity therewith; and size 49 of the active set of a terminal, that represents the maximum number of cells that can be found in macro-diversity on a territory portion, that can be managed by the terminal.

The system can provide the following data as output:

a subset 50 of cells selected for activation;

the carried traffic (or load) 52 of the selected cells; and the globally covered geographic area 54.

In the following description, $N_{candidatecells}$ defines the number of cells being present in the area considered by planning and candidate for activation, and project constraints 20 and 22 are used for determining the minimum area to be covered and the minimum traffic to be carried by the solution obtained at the end of the optimisation procedure. Such quantities are expressed by the relationships:

$$A_{\min} = \alpha \cdot \sum_{i=1}^{N_{candidatecells}} A_i^{service}$$

$$T_{\min} = \beta \cdot \sum_{i=1}^{N_{candidatecells}} \sum_{j=1}^{S} T_j^{(i)}$$

where:

α (whose value is included between 0 and 1) corresponds to the constraint 20 on minimum area to be covered with respect to the area guaranteed by the complete set of candidate cells for activation;

β (whose value is included between 0 and 1) corresponds to the constraint 22 on minimum traffic to be carried computed with respect to the traffic guaranteed by the complete set of candidate cells for activation;

S represents the number of types of traffic being taken into account (namely the services);

$A_i^{service}$ and $T_j^{(i)}$ are respectively the covered area and the carried traffic (of the j-th type) by the i-th active cell (in the current case the complete set of $N_{candidatecells}$ candidate cells is deemed active).

Definition and following use of parameters $A_{min}$ and $T_{min}$ allow overcoming the evident prior art limits, because they allow identifying those solutions that comply with both project constraints. Such solutions are called "solutions with Non Relaxed Constraints" (VNR) herein below. According to the present description, a generic solution is defined as VNR type if it complies with the conditions expressed by the relationships:

$$\begin{cases} A_{Nactivecells}^{service} = \sum_{i=1}^{N_{activecells}} A_i^{service} \geq A_{\min} \\ T_{Nactivecells}^{processed} = \sum_{i=1}^{N_{activecells}} \sum_{j=1}^{S} T_j^{(i)} \geq T_{\min} \end{cases}$$

where $N_{activecells}$ are the active cells in the evaluated solution and $A_i^{service}$ and $T_j^{(i)}$ are, in this case, the covered area and the carried traffic (of the j-th type) from the i-th active cell of the considered subset.

In addition to the described solutions of the VNR type, those solutions that do not comply with the coverage and carried traffic constraints, but that comply with an admissibility condition relaxed within a predefined threshold are defined herein below as "solutions with Relaxed Constraints" (VR).

In particular, having defined as $\delta_\alpha$ and $\delta_\beta$ the relaxation admissibility thresholds 24 and 26 on minimum requirements for covered area and carried traffic, a solution is of the VR type if it complies with the conditions:

$$(\alpha - \delta_\alpha) \cdot \sum_{i=1}^{N_{candidatecells}} A_i^{service} \leq A_{Nactivecells}^{service} < A_{min} \text{ and } T_{Nactivecells}^{processed} \geq T_{min}$$

or $$(\beta - \delta_\beta) \cdot \sum_{i=1}^{N_{candidatecells}} \sum_{j=1}^{S} T_j^{(i)} \leq T_{Nactivecells}^{processed} < T_{min} \text{ and } A_{Nactivecells}^{service} \geq A_{min}$$

or $$(\alpha - \delta_\alpha) \cdot \sum_{i=1}^{N_{candidatecells}} A_i^{service} \leq A_{Nactivecells}^{service} < A_{min} \text{ and}$$

$$(\beta - \delta_\beta) \cdot \sum_{i=1}^{N_{candidatecells}} \sum_{j=1}^{S} T_j^{(i)} \leq T_{Nactivecells}^{processed} < T_{min}$$

Synthetically, the method of the invention operates in order to select, within a wider set of candidate sites for activating cells in a telecommunications network, for example of the third-generation type, the most suitable cells (or the sites composed of many cells) for providing a satisfactory radio-electric and service coverage.

In order to evaluate the quality of a generic solution and allow, therefore, the comparison between different solutions to the site selection problem, the method uses a cost function within which various cost item types are present and suitably weighed.

The function form, of the type known from the Graduation Thesis "Metodo automatico per la pianificazione di una rete UMTS mediante la valutazione di insieme di siti candidati", is expressed by the relationship:

$$F_C = W_1 \cdot A_{NS}^\% + W_2 \cdot T_{NS}^\% + W_3 \cdot S_C + W_4 \cdot S_{SH}$$

in which—as recalled—$W_1$, $W_2$, $W_3$, $W_4$ represent the weights associated with each function term; the first two cost items $A_{NS}^\%$ and $T_{NS}^\%$ respectively represent, the first one the ratio between the geographic area not served by the subset of cells deemed as active and the area served with all candidate cells active, the second one, similarly, the ratio between traffic not carried by the subset of cells deemed as active and the carried traffic with all candidate cells active. The further cost items, instead, represent an indication of the mean square deviation respectively of cell load $\eta_{cell}^i$ and soft hand-over load $\eta_{SHO}^i$ computed depending, as regards the first one, on the ideal cell load and, as regards the second one, on the ideal soft hand-over load.

In the preferred embodiment, the relationship that expresses the cost function is modified into:

$$F_C = W_1 \cdot A_{NS}^\% + W_2 \cdot T_{NS}^\% + W_3 \cdot S_C + W_4 \cdot S_{SH} + W_5 \cdot T_{PP}^\%$$

in which $W_1$, $W_2$, $W_3$, $W_4$, $W_5$ represent the weights associated with each function term, the cost items $A_{NS}^\%$, $T_{NS}^\%$, $S_C$ and $S_{SH}$ have been defined immediately above and the term $T_{PP}^\%$ is function of the pilot pollution being present in the system and is expressed by the relationship:

$$T_{PP}^\% = \frac{\sum_{i=1}^{N_{activecells}} \sum_{k=1}^{N_{activecells}} \sum_{j=1}^{S} T_{j \leftarrow k}^{(i),PP}}{T_{PP}^{Max}}$$

where $T_{j \leftarrow k}^{(i),PP}$, of a known type, is equal to the j-th service traffic carried by the i-th cell and placed in pilot pollution by the k-th cell.

The parameter $T_{PP}^\%$ numerator corresponds to the global traffic in pilot pollution associated with the set of active cells being present in the examined solution; the denominator, instead, expresses the maximum pilot pollution that can be found in the system under the worst identifiable conditions for the set of candidate cells for the activation.

The denominator $T_{PP}^{Max}$ is computed as follows:

i) for each pixel (h,k) of the territory that is electro-magnetically covered by one or more candidate cells:
  the list ordered by decreasing field levels of the CPICH channel is built depending on the cells in the pixel;
  if N cells are identified, at the generic i-th step of the computation procedure, the i-th cell of the previously built list is taken into account and all cells preceding it in the list are deemed as "turned off"; for the current cell, the number of cells satisfying the following criteria is evaluated:
    they have such a field level as to enter into the macro-diversity window generated starting from the CPICH channel level of the i-th cell;
    they are not part of the active set of the generic terminal placed in pixel (h,k);
  the above-described operation is repeated for all N cells being present in the pixel ($i \in [1,N]$);
  the maximum value is collected, indicated with $Num_{(k,h)}$, among the N elements computed as described;

ii) for the area considered by planning, $T_{PP}^{Max}$ is computed through the relationship:

$$T_{PP}^{Max} = \sum_{S_{pixel}} Num_{(h,k)} \cdot T_{(h,k)}$$

where $T_{(h,k)}$ is equal to the total traffic associated with pixel (h,k) and Spixel is the set of pixel of the territory in which there is at least one candidate cell.

In such context, the ideal coverage concept is extended, according to the invention, to the cost item related to pilot pollution that must be, under optimum conditions, equal to 0.

Figure 2:
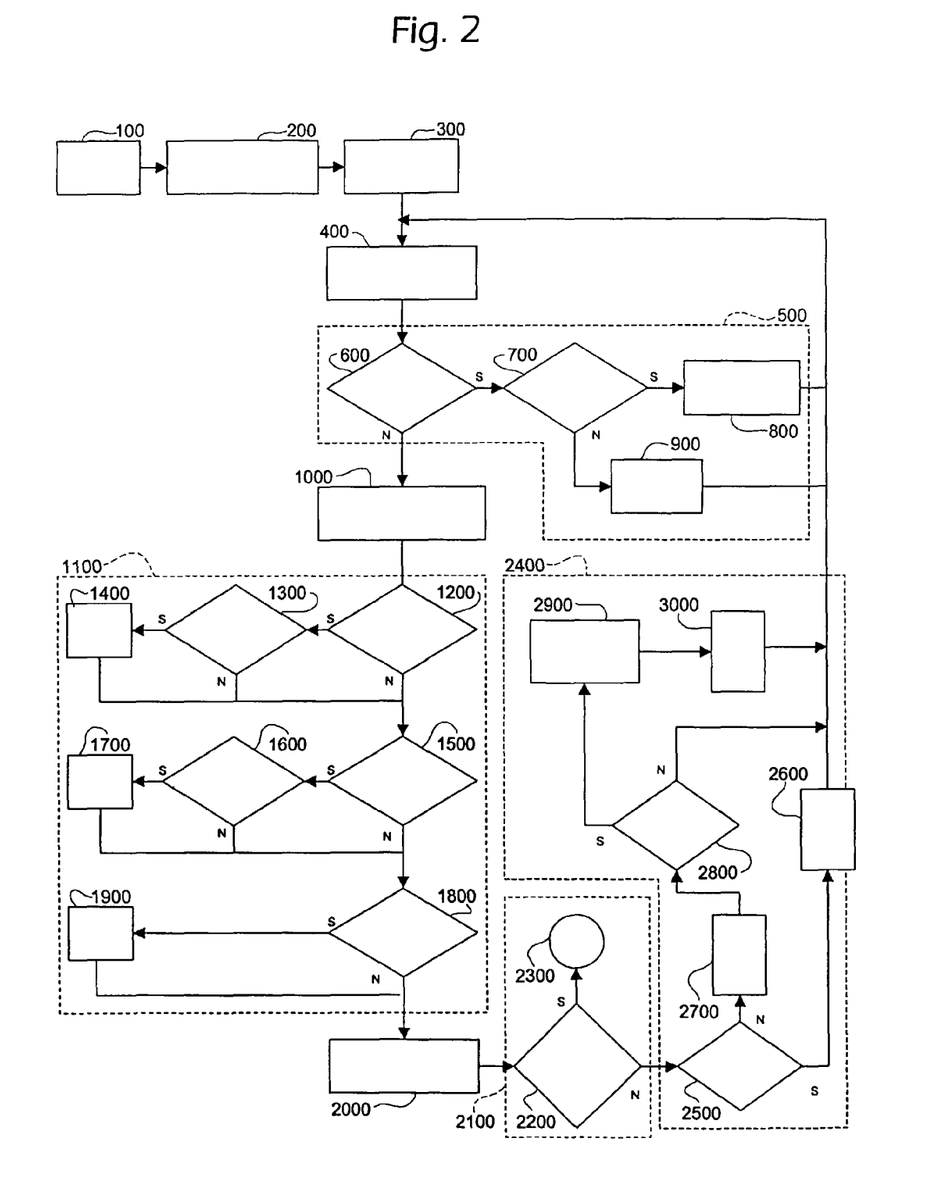
FIG. 2 is a global flow diagram of the method according to the invention.

With reference to FIG. 2, the selection method starts—at step 100—from evaluating the configuration with the whole set of active candidate cells performed by module 14, depending on whose results an initial solution is built—at step 200—that will be described in detail herein below with reference to FIG. 3.

As previously mentioned, those solutions composed by subsets of cells (or sites) that, once activated, simultaneously comply with project constraints related to minimum area to be covered and minimum traffic to be carried are defined as VNR solutions.

The initial solution built in step 200 belongs to such family of solutions.

Then, in step 300, a storage is performed of the initial solution obtained as best solution of the VNR type.

After having ended the algorithm initialisation step, the real optimisation method is performed, that provides for the iterative application of the below-described operations.

In a step 400 the neighbourhood of solutions "nearby" the current solution is generated. Such step is characterised by its innovative features, since it provides for:

- building a neighbourhood composed of solutions "nearby" the current solution obtained both by activating "inactive" cells, and by deactivating "active" cells; such characteristic is different from the prior art in which the neighbourhood was obtained by actuating individual "alternate" moves (namely with an "alternate" sequence of an iteration characterised by solutions that are exclusively obtained through activation moves, followed by an iteration characterised by solutions that are obtained exclusively through deactivation moves). The techniques according to the prior art disadvantageously brought about a final solution characterised by a number of active cells that is very similar to the initial solution one;
- building a neighbourhood whose size changes in time; the size, corresponding to the number of evaluated solutions, depends on an algorithm memory depending on the path performed when exploring the space of solutions;
- building a neighbourhood whose composition changes in time; the composition, corresponding to the mix of obtained solutions through activation and deactivation moves, depends, also in this case, on an algorithm memory depending on the path performed when exploring the space of solutions.

In the preferred embodiment, in order to take into account the pilot pollution, the step of generating the neighbourhood of "nearby" solutions provides for the building of a deactivation neighbourhood depending on the pilot pollution being present in the system. Step 400 will be more widely described below with reference to FIG. 4.

In a step 500 following the completion of step 400 for building the neighbourhood of nearby solutions, the possible need is evaluated for performing a "restore" procedure for a solution. Purpose of such procedure is avoiding stopping in advance the algorithm evolution due to the impossibility of building a non-empty neighbourhood of "nearby" solutions to the current solution.

Such procedure comprises a step 600 for checking, according to known techniques, the solution neighbourhood size; if the neighbourhood is not empty, a step 1000 is started for evaluating the neighbourhood solutions, according to known techniques, otherwise step 700 checks the existence of one or more previously stored solutions available for a "restore".

If the solution exists, a real "restore" step 800 is performed for the best stored solution and the related evaluation of the solution itself, and then step 400 is re-started for building the neighbourhood of nearby solutions to the current solution.

If the "restore" solution does not exist, a casual solution is built in step 900 through which the optimisation process can be restarted, again closing the cycle at step 400.

In case of cell-based selection (related to the value assumed by parameter or flag 32), the cells deemed as active in the generated casual solution belong to three different subsets, the first one being composed of cells belonging to the list 34 of compulsorily active cells, the second one being composed of cells placed in the "not able to be turned off" status due to a cell load that is higher than a predefined threshold load in the configuration with all active candidate cells, and the third one being composed of casually extracted cells from those not satisfying the criteria described above.

In case of site-based selection, the present step of generating a casual solution implies activating sites that have at least one cell satisfying the described conditions.

Step 1000 performs the evaluation of solutions being part of the neighbourhood of "nearby" solutions to the current solution built in step 400 through the deterministic module 14 for evaluating performances of a set of network cells.

After the evaluation of neighbourhood solutions, a step 1100 is performed for storing the interesting solutions. These latter ones belong to three different types:

- optimum solution with not relaxed constraints (optimum VNR);
- optimum solution with relaxed constraints within predefined thresholds (optimum VR);
- best second choice discarded during each algorithm iteration.

Such step provides—in step 1200—the check for the existence of (one or more) solutions of the VNR type in the evaluated neighbourhood. If some exist, the check is performed—in step 1300—for the existence of one or more solutions with non relaxed constraints that improve the optimum of the VNR type (namely the solution cost) and, if there is at least one of them, storing of the best solution is performed—in step 1400. If there is no VNR solution (checking step 1200) or if the identified solutions do not improve the VNR-type optimum (checking step 1300), and anyway downstream of the possible storing in step 1400, a step 1500 is performed for checking the existence of VR solutions.

If there are one or more solutions with relaxed constraints within prefixed thresholds (VR) in the neighbourhood, the check is performed—in step 1600—for the existence of one or more solutions that improve the VR-type optimum (namely the solution cost), and, if there is at least one of them, storing of the best solution is performed—in step 1700. If there is no VR solution (checking step 1500) or if the identified solutions do not improve the VR-type optimum (checking step 1600), and anyway downstream of the possible storing in step 1700, a step 1800 is performed for checking the existence of at least one discarded solution belonging to the neighbourhood of solutions.

If there are one or more solutions of such type, storing of the best among them is performed—in step 1900; if there is no discarded solution (checking step 1800), and anyway downstream of the storing in step 1900, a step 2000 is performed for selecting the best solution belonging to the neighbourhood evaluated as new current solution.

The solution stored in step 1900 is the solution that the algorithm can "restore" as described above, in step 800. The stored solutions in steps 1400 and 1700 are output from the processing module 12 at the end of the algorithm execution as subset 50 of cells selected for activation.

The selection in step 2000 occurs depending on the value assumed by the cost function of the evaluated solutions. During such step, the type of performed move is further verified: if this latter one is of the same type as the one performed during the previous iteration, a counter $N_{cons}$ (whose value is equal to the number of consecutive iterations performed by carrying out the same type of move) is increased by one unit, otherwise the same counter is set to value 1.

Afterwards, a step 2100, updated according to the invention, for checking the selection algorithm ending conditions provides—in step 2200—for the check of provided ending conditions, such as, for example, the completion of the granted processing time or the obtainment of an absolute optimum (null cost function). If at least one of the output conditions is verified, the algorithm stops, in step 2300, its own evolution, otherwise step 2400 is carried out.

After having ended the neighbourhood exploration for the current solution in step 2000 and having checked the algorithm output conditions in step 2100, step 2400, peculiar characteristic of the invention, is performed for monitoring and implementing an algorithm "restore" procedure.

Such step provides—in step 2500—for a check of the existence of at least one VNR or VR solution in the neighbourhood evaluated in steps 1000 and 2000. In case of an affirmative reply—in step 2600—a counter is reset of the number of consecutive iterations performed without evaluating at least one solution of the VNR or VR type (namely far from the admissibility area—namely from VNR solutions—or almost admissibility area—namely from VR solutions—of the space of solutions), and step 400 for building a new neighbourhood is afterwards restarted. In case of negative reply—in step 2700—the above counter is increased and then, in step 2800, a comparison is made between the value present in the relevant counter and the maximum admissible number of iterations far from the admissibility or quasi-admissibility area of the space of solutions.

If such value has been reached, a step 2900 is performed for carrying out the real algorithm "restore" procedure, downstream of which the above counter is reset (in step 3000) and step 400 for building a new neighbourhood is afterwards restarted; otherwise step 400 is directly performed.

The "restore" procedure in step 2900 allows obtaining with certainty a solution with complied-with constraints starting from the selected solution in step 2000, and this will be described more in detail below with reference to FIG. 5.

The individual procedures for building the initial solution, the neighbourhood of nearby solutions to the current solution and the algorithm "restore", mentioned in the previous disclosure, will be described below.

The Procedure for Building an Initial Solution

Figure 3:
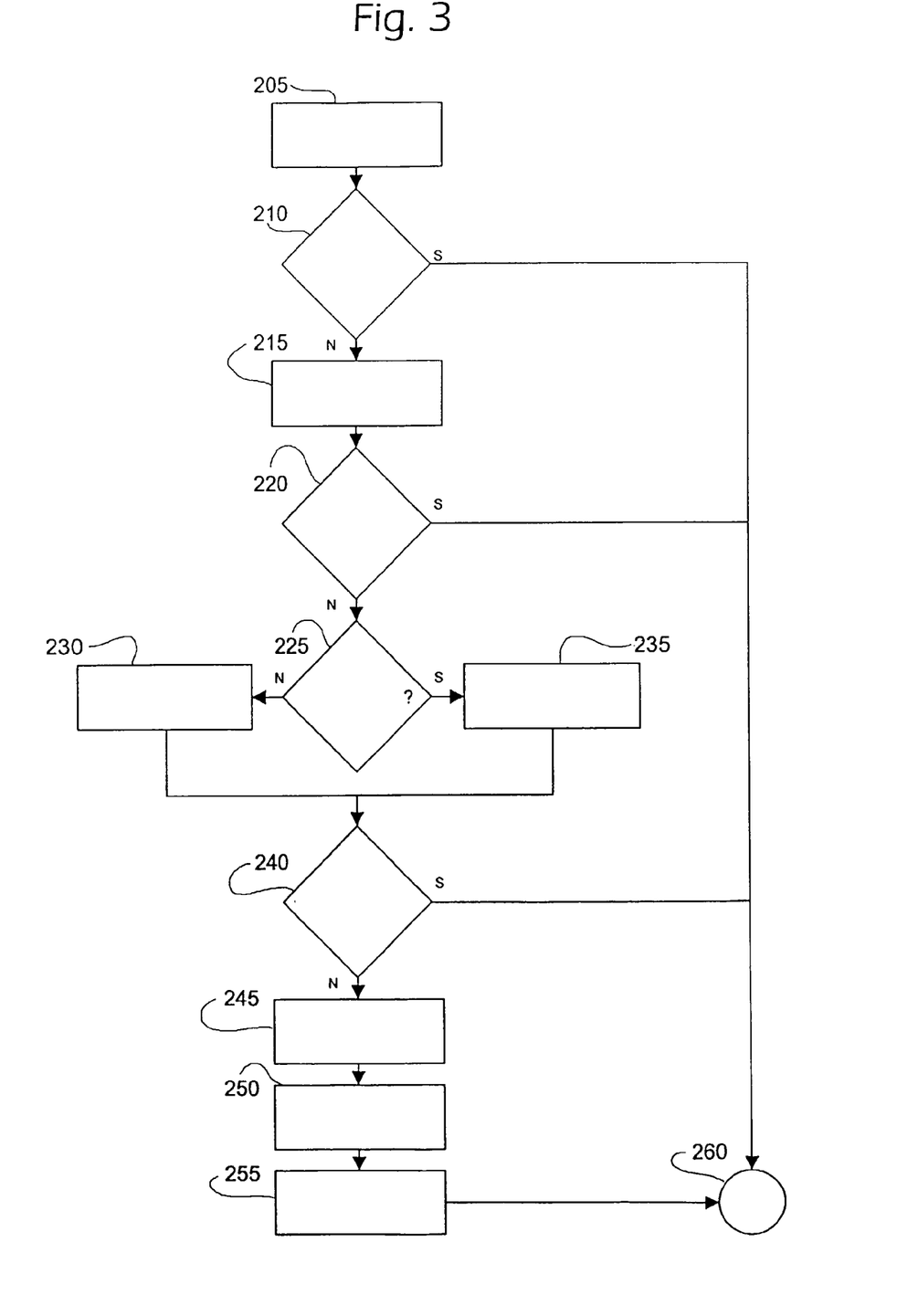
FIG. 3 is a flow diagram of the procedure for defining an initial solution, identified in the diagram of FIG. 2.

With reference now to FIG. 3, the procedure 200 is described for building an initial solution, of the VNR type, with reference to the cell-based selection established by parameter 32. In case of site-based selection, instead, the below described operations based on cells are extended to all sites having at least one cell satisfying the described conditions.

Purpose of procedure 200 is determining a VNR-type of solution to be optimised in the following steps and that as a minimum contains, as active cells, the compulsorily active cells and the cells deemed as "not able to be turned off".

In a sub-step 205 a "type 0" solution is built and evaluated (by computing its own cost function), obtained by activating the cells belonging to the list 34 of compulsorily active cells and the cells deemed as "not able to be turned off" due to a cell load that is higher than a predefined threshold load in the configuration with the complete set of active candidate cells (computed in step 100).

In step 210 it is checked whether solution "0" belongs to the set of VNR-type solutions; if the check result is positive, step 260, of a known type, is performed for exiting the initial solution defining procedure, otherwise step 215 is performed for building a "I-type" initial solution. The "I-type" initial solution is build by activating cells belonging to the list 34 of compulsorily active cells, the cells placed in the "not able to be turned off" status due to a cell load that is higher than a predefined threshold load in the configuration with all active candidate cells and the cells placed in the "able to be turned off" status due to a cell load that is lower than a predefined threshold load in the configuration with all active candidate cells, but not having in such configuration any adjacent cell in soft hand-over.

In step 220, similarly to step 210, it is checked whether solution "I" belongs to the set of VNR-type solutions; if the check result is positive, step 260 is performed for exiting the initial solution defining procedure, otherwise the procedure proceeds to step 225 for checking the solution characteristics with the complete set of active cells.

If the average load of cells in the configuration with the complete set of active candidate cells is greater than the predefined threshold load, step 230 is performed, otherwise step 235 is performed, for building new solutions.

In step 230 a "II-type" solution is built, while in step 235 a "III-type solution is built".

The "II-type" solution is built by activating the cells belonging to the list 34 of compulsorily active cells, the cells placed in the "not able to be turned off" status due to a cell load that is higher than a predefined threshold load in the configuration with all active candidate cells, the cells placed in the "able to be turned off" status due to a cell load that is lower than a predefined threshold load in the configuration with all active candidate cells, but not having in such configuration any adjacent cell in soft hand-over, and the cells candidate to "capture" (since characterised by a low load or traffic) the associated load, in the configuration with all active candidate cells, to the cells to be deactivated (namely the cells "able to be turned off" with one or more adjacent cells in soft hand-over in the configuration with all active candidate cells).

The "III-type" solution is built by activating the cells belonging to the list 34 of compulsorily active cells, the cells placed in the "not able to be turned off" status due to a cell load that is higher than a predefined threshold load in the configuration with all active candidate cells, the cells placed in the "able to be turned off" status due to a cell load that is lower than a predefined threshold load in the configuration with all active candidate cells, but not having in such configuration any adjacent cell in soft hand-over, and the cells candidate to "capture" (since characterised by a high adjacency parameter in soft hand-over) the associated load, in the configuration with all active candidate cells, to the cells to be deactivated (namely the cells "able to be turned off" and with one or more adjacent cells in soft hand-over in the configuration with all active candidate cells).

In step 240, similarly to steps 210 and 220, it is checked whether solution "II" or solution "III" belong to the set of VNR-type solutions; if the check result is positive, step 260 is performed for exiting the initial solution defining procedure, otherwise step 245 is performed for building the type IV', IV" and IV''' solutions.

The three referred-to solutions are defined as follows:

Solution IV'

The subset of cells is selected, placed in the "able to be turned off" status (composed of $M_{max}$ elements) downstream of the configuration evaluation with the complete set of active candidate cells, then, for each selected cell, the sum $S_{A\&T}$ is computed of the percentages of covered area with respect to total covered area with the configuration of all active candidate cells, and the carried traffic with respect to the total carried traffic under the configuration with all active candidate cells.

Afterwards, an ordered list by increasing $S_{A\&T}$ is built of the $M_{max}$ selected cells.

Among the identified cells, the one to which the minimum of parameter $S_{A\&T}$ is associated, is selected and placed in the "turned off" status if, following its deactivation, the remaining covered area and carried traffic satisfy the project constraints.

If downstream of the selection, there are no further cells in the "able to be turned off" status, or at least one of the project constraints is not observed, the process ends, otherwise the selection step is repeated.

Through the described procedure, the first $M'_{IV}$ cells (with $M'_{IV} \leq M_{max}$) of the list ordered by increasing $S_{A\&T}$ are deactivated.

It must be noted how the thereby obtained solution surely complies with the project constraints, since a decrease of the covered area and the carried traffic is evaluated that is equal to the covered area and the carried traffic, in the configuration with all active candidate cells, by the cell being turned off. Such assumption is conservative since part of the area and traffic left uncovered of the cell placed in the "turned off" status is acquired by one or more cells that are still active in the resulting system.

Solution IV"

The subset of cells is selected that are placed in the "able to be turned off" status (composed of $M_{max}$ elements) downstream of the configuration evaluation with the complete set of active candidate cells, then a list of the $M_{max}$ selected cells is composed, ordered by increasing carried traffic in the configuration with the complete set of active candidate cells.

Among the identified cells, the one to which the minimum carried traffic is associated, is selected if, after its deactivation the remaining carried traffic satisfies the related project constraint.

If downstream of the selection, there are no further cells in the "able to be turned off" status or the constraint is not observed, the process proceeds to the following step, otherwise the selection step is repeated. At the end of the selection of "able to be turned off" cells to which the minimum carried traffic is associated, a list is built ordered by increasing covered area of the T (with $T \leq M_{max}$) cells selected through the described criterion.

Then, among the previously identified T cells, the cell is selected with which the minimum covered area is associated and this is "turned off" if, after turning off, the remaining coverage satisfies the related project constraint. If there are no further cells in the list of T elements, or if the constraint has not been observed, the process ends, otherwise the selection step by covered area is repeated.

Through the described procedure, $M''_{IV}$ cells (with $M''_{IV} \leq T \leq M_{max}$) are deactivated.

Also in this case, there remains valid what has been stated for the initial solution of the IV' type about the conservative estimations related to decrease of the guaranteed coverage and the carried traffic by the still-active cells in the resulting system.

Solution IV'''

The subset of cells is selected that are in the "able to be turned off" status (composed of $M_{max}$ elements) downstream of the configuration evaluation with the complete set of active candidate cells, then a list of the $M_{max}$ selected cells is built, ordered by increasing covered area in the configuration with the complete set of active candidate cells.

Among the identified cells, the one with which the minimum covered area is associated, is selected if, after its deactivation, the remaining covered area satisfies the related project constraint.

If, downstream of the selection, there are no further cells in the "able to be turned off" status or the constraint is not observed, the process proceeds to the following step, otherwise the selection step is repeated.

At the end of the selection of "able to be turned off" cells with which the minimum covered area is associated, a list is built ordered by increasing carried traffic of the A (with $A \leq M_{max}$) cells selected through the described criterion.

Then, among the A previously identified cells, the cell with which the minimum carried traffic is associated, is selected and "turned off" if, after turning off, the remaining carried traffic satisfies the related project constraint. If there are no further cells in the list of A elements or if the constraint is not observed, the process ends, otherwise the selection step is repeated by carried traffic.

Through the described procedure, $M'''_{IV}$ cells (with $M'''_{IV} \leq A \leq M_{max}$) are deactivated.

Also in this case, there remains valid what has been stated for the previous cases about the conservative estimations related to decrease of the guaranteed coverage and the carried traffic by the still-active cells in the resulting system.

After building the type IV', IV" and IV''' solutions, in step 250 the solution that, among the described IV', IV" and IV''' solutions, minimises the number of active cells, is selected.

In step 255 the selected "IV-type" solution is evaluated (by computing its own cost function), and in step 260 the initial solution defining procedure ends.

The Procedure for Building a Neighbourhood of Nearby Solutions

Figure 4:
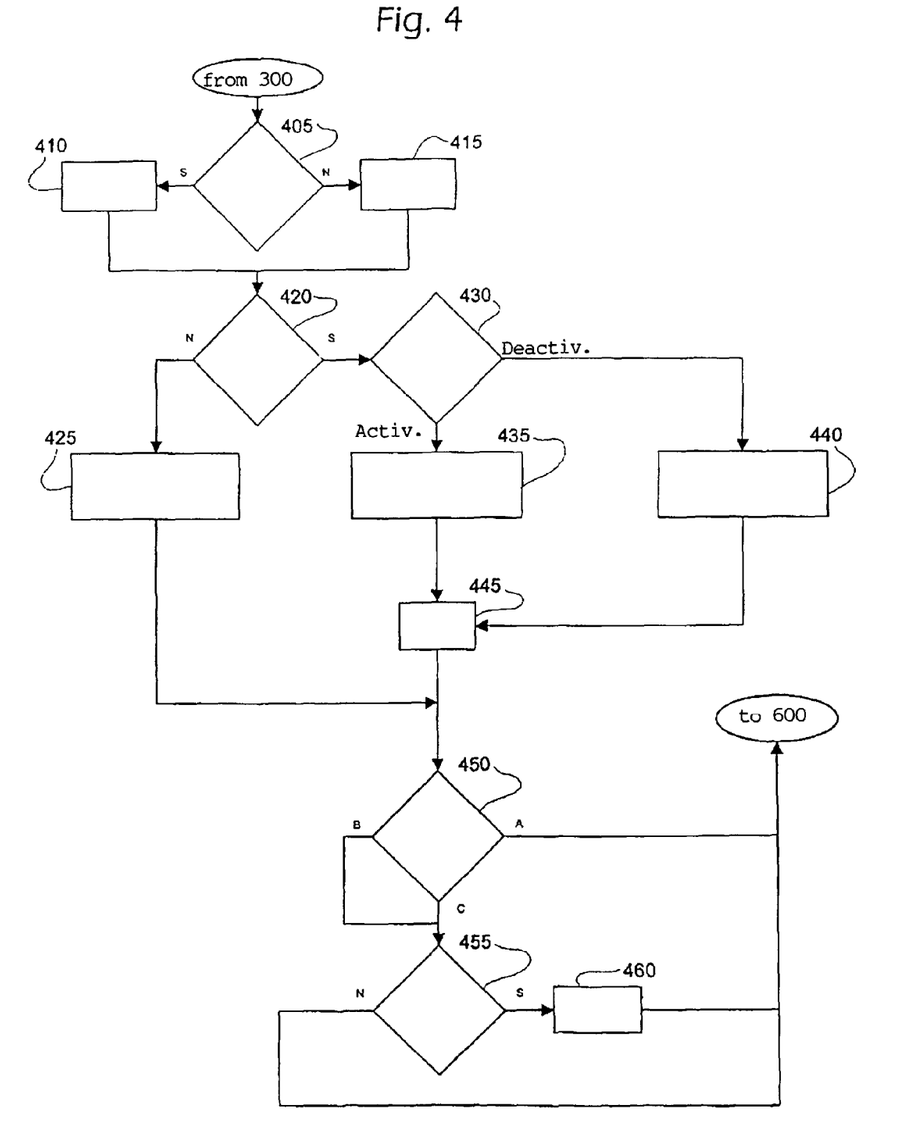
FIG. 4 is a flow diagram of the procedure for building the neighborhood of solutions "nearby" the current solution, identified in the diagram in FIG. 2.

Referring now to FIG. 4, the procedure for building the neighbourhood of "nearby" solutions to the current solution is described in detail.

In step 405 an evaluation is performed about the usefulness of a step for increasing the neighbourhood sizes (intensification step); the solution obtained during a previous iteration or the initial solution obtained at the first iteration is deemed interesting in order to intensify the local search if:

it has or represents a relative minimum for at least one of the cost function terms; or it has or represents a relative minimum as regards the number of active cells or sites; or it is an optimum of the VNR type; or it is an optimum of the VR type.

If the solution obtained in the previous iteration is deemed interesting in step 405, a step 410 is performed for selecting the building of a neighbourhood of the current solution with "high" sizes, namely containing a number of solutions that is equal to at least twice a neighbourhood of "standard" sizes as defined below. If the obtained solution in the previous iteration is not deemed interesting in step 405, a step 415 is performed for selecting the building of a neighbourhood of the current solution whose sizes, in terms of number of solutions, are empirically determined, for example depending on the available processing time and the problem sizes (number of candidate cells or sites). Such number of solutions is called here neighbourhood with "standard" sizes.

In step 420, following step 410 or 415, the types of moves performed in the previous algorithm iterations are checked. If the last $N_{max}$ moves do not belong to the same type (condition verified for $N_{cons} < N_{max}$, where $N_{cons}$ has been defined previously), step 425 is performed, otherwise step 430 is performed.

Step 425 implies building a neighbourhood of the so-called "A type", comprising solutions obtained both through activation moves and through deactivation moves.

In step 430 the belonging type of moves performed during the last $N_{max}$ iterations is checked and, if the considered moves are of the activation type, step 435 is afterwards performed, otherwise step 440 is performed.

Step 435 implies building a neighbourhood of the so-called "B-type", comprising solutions exclusively obtained by performing activation moves.

Step 440 implies building a neighbourhood of the so-called "C-type", comprising solutions obtained by performing deactivation moves.

After having built a neighbourhood of the B or C type respectively occurred in step 435 or 440, in step 445 the counter of consecutive iterations characterised by neighbourhoods of the single-move type, namely composed of solutions obtained by exclusively performing moves of a same type, is incremented.

After having performed the update of the above counter in step 445, the algorithm advances to step 450 for checking the type of used neighbourhood. If the neighbourhood is obtained through moves of the same type (B- or C-type neighbourhood) step 455 is performed, otherwise the iteration is deemed as ended and the algorithm proceeds to step 600.

Step 455 verifies whether the maximum number of consecutive iterations, characterised by neighbourhoods of the single-move type, has been reached. If the predefined limit is not reached, the iteration is deemed as ended and the algorithm proceeds to step 600; otherwise, in step 460, the above counter is zeroed and the counter of the number $N_{cons}$ of consecutive iterations performed by executing the same type of move is set to $N_{max}-1$; at the end of such step, the iteration is deemed as ended and the algorithm proceeds to step 600.

The criteria for selecting the cells to be activated are of a known type. The cells to be activated are those that could result useful in order to remove the coverage and/or traffic holes or the support to cells adjacent thereto characterised by very high cell load ($\eta^i_{cell}$) values; in particular, the selected cell $C_x$ for the activation must:

be deactivated in the current solution $S_i$; and have, in the configuration with all active candidate cells, an adjacent cell $C_y$ in soft hand-over and therefore a very high soft hand-over adjacency parameter $\text{Adj}_{SH}^{Cx-Cy}$ towards the cell $C_y$ itself; in addition to this, the cell $C_y$ in the current solution $S_i$ must be characterised by a high cell load value, that points out the need for activating a cell $C_x$ adjacent thereto that can "capture" part of the carried traffic associated therewith.

Parameter $\text{Adj}_{SH}^{A-B}$ represents the so-called soft hand-over adjacency between a pair of cells. In more detail, the soft hand-over adjacency between two cells A and B corresponds to a percentage computed as ratio between the macro-diversity area of the two cells and the global service area, sum of the service areas in A and B, and is expressed by the relationship:

$$Adj_{SH}^{A-B} = \left( \frac{A_{A-B}^{macro-diversity}}{A_A^{service} + A_B^{service}} \right) * 100$$

The criteria for selecting the cells to be deactivated can generally be of a known type. In such case, the cells to be deactivated are those characterised by very low cell load ($\eta^i_{cell}$) values; in particular, the cell $C_x$ selected for deactivation must also:

be active in the current solution $S_i$; and have a high value of the soft hand-over adjacency parameter $\text{Adj}_{SH}^{Cx-Cy}$ towards an active cell $C_y$ not excessively loaded in the current solution; in such case, by deactivating cell $C_x$, cell $C_y$ "captures" a meaningful part of the previously carried traffic by the deactivated cell.

In the preferred embodiment in which the pilot pollution phenomenon is taken into account, the deactivation neighbourhood building is, instead, innovative. If $N_{deact}$ are the cells to be selected for the possible deactivation, the current neighbourhood building procedure depends on the presence of the pilot pollution in the system and is structured into two preliminary sub-steps and a final selection step as follows.

Selection Sub-Step per Cell Load

Active cells in current solution $S_i$ are ordered by increasing cell load, and, among those that have still not been analysed, the cell $C_x$ is identified that satisfies the following requirements:

it is active in the current solution $S_i$;
it is in the "able to be turned off" status;
it is characterised by the minimum cell load.

If no cell has been identified, the selection process stops; otherwise, the identified cell $C_x$ is selected for deactivation if it has at least one adjacent cell in soft hand-over in the current solution with cell load lower than the maximum load; in such case, the adjacent cell $C_y$ characterised by the highest value of parameter $\text{Adj}_{SH}^{Cx-Cy}$ in solution $S_i$ is placed in the "not able to be turned off" status for the remaining part of the selection step.

If there is no adjacent cell in soft hand-over in the current solution, cell $C_x$ is discarded and a further cell $C_x$ is searched among those that have not yet been examined. Otherwise, it is checked whether the number of selected cells for building the deactivation neighbourhood (sub-neighbourhood) per cell load is equal to $N_{deact}$; if the reply is affirmative, the process stops, otherwise a further cell $C_x$ is searched among those that have not yet been examined.

Selection Sub-Step per Pilot Pollution

Active cells in current solution $S_i$ are increasingly ordered depending on the parameter expressed by the relationship:

$$A_{PP} = \frac{\sum_{i=1}^{N_{activecells}} T_{i \leftarrow Cx}^{PP}}{T_{Cx}^{TOT}}$$

where $T_{i \leftarrow Cx}^{PP}$ is the carried traffic by the generic i-th cell placed in pilot pollution by cell $C_x$, $N_{activecells}$ is the number of active cells in the evaluated solution and $T_{Cx}^{TOT}$ is the globally carried traffic by cell $C_x$.

The $A_{PP}$ numerator expresses the advantage, in terms of pilot pollution decrease, deriving from the cell $C_x$ deactivation, while its denominator expresses the potential disadvantage, related to the same cell deactivation, assuming that all traffic carried thereby goes to pilot pollution downstream of the deactivation.

Then, among those that have not yet been analysed, the cell $C_x$ satisfying the following requirements is identified:

it is active in the current solution $S_i$;
it is in the "able to be turned off" status;
it is characterised by the maximum value of parameter $A_{pp}$.

If no cell is identified, the selection process stops; otherwise, the identified cell $C_x$ is selected for deactivation if it has in soft hand-over adjacency, in the current solution, a set of base radio stations that are able to "capture" the cell load $\eta_{cell}$ left free downstream of the deactivation of $C_x$. In such case, the adjacent cells in soft hand-over placed in the "able to be turned off" status in solution Si pass from the "not able to be turned off" status for the remaining part of the selection step.

If there are no adjacent cells able to "capture" what has been previously carried by the base radio station $C_x$, the identified cell is discarded and a further cell $C_x$ is searched among those that have not yet been examined.

Otherwise, it is checked whether the number of selected cells for building the deactivation neighbourhood (sub-neighbourhood) for pilot pollution is equal to $N_{deact}$; if the reply is affirmative, the process stops, otherwise a further cell $C_x$ is searched among those that have not yet been examined.

Final Selection Sub-Step

The set of $N_{deact}$ cell to be taken into account for their possible deactivation is built starting from the sets defined depending on cell load and pilot pollution conditions; the final selection procedure is structured as follows:

- if the global number of selected cells in the two previous sub-steps is not greater than $N_{deact}$, the deactivation neighbourhood is built by using the complete set of previously-identified cells;
- if the global number of selected cells in the two previous sub-steps is greater than $N_{deact}$ the following steps are performed:
- those cells identified both in the first and in the second sub-step (namely in common between the two sets) are selected, for performing the deactivation moves;
- if, in the previous step, less than $N_{deact}$ cells have been finally selected, the missing cells are added, alternatively taking them from the two sets and starting from the one related to pilot pollution.

After having completed step 400 of building the neighbourhood of "nearby" solutions to the current solution, calling $M_{act}$ and $M_{deact}$ the selected cells, respectively for activation and deactivation (if the cell-based selection has been selected through parameter 32), the number of evaluated activation solutions (equal to $Sol_{act}$) and deactivation solutions (equal to $Sol_{deact}$) is expressed by the relationships:

$$Sol_{act} = \sum_{i=1}^{M_{act}} \binom{M_{act}}{i}$$

$$Sol_{deact} = \sum_{i=1}^{M_{deact}} \binom{M_{deact}}{i}$$

and corresponds to the complete set of possible activation and deactivation combinations of the selected cells (it must be noted how the evaluation of solutions obtained by simultaneous activation and deactivation of cells is not provided).

In case of site-based selection, related to the value assumed by parameter 32, the known operations described on cell base for building the deactivation neighbourhood (sub-neighbourhood) are extended to all sites having at least one cell that satisfies the described conditions.

The Algorithm "Restore" Procedure

Figure 5:
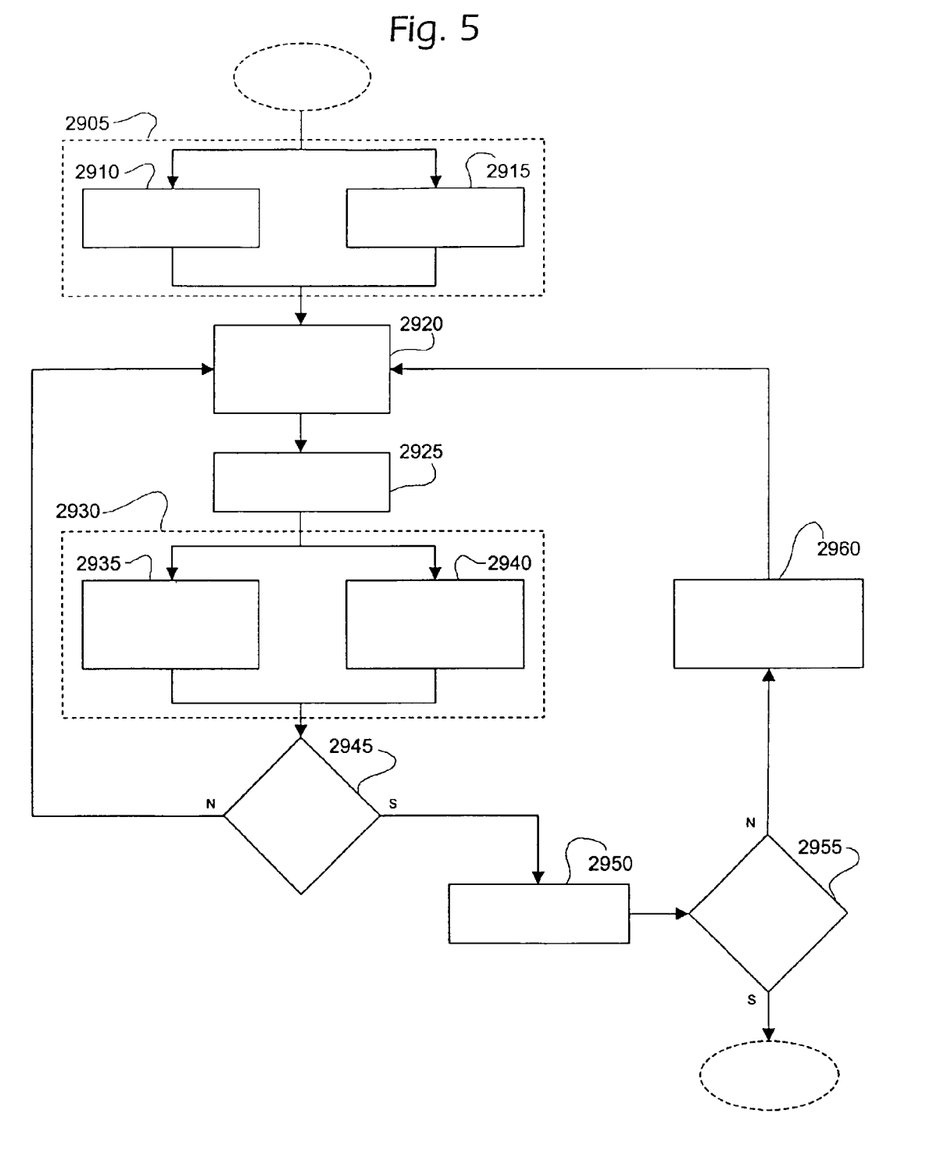
FIG. 5 is a flow diagram of the algorithm "re-emerging" procedure, identified in the diagram in FIG. 2.

Referring now to FIG. 5, the algorithm "restore" procedure is described in more detail, in case of cell-based selection as established by the parameter or flag 32 value.

In step 2905 the restart procedure initialisation is performed. Such operation is divided into a first sub-step 2910, in which the Evaluated Covered Area ("Area Coperta Stimata") parameter is set equal to the area covered by current solution starting from which the restart procedure is started, and a second sub-step 2915, in which the Evaluated carried Traffic ("Traffico Smaltito Stimato") parameter is set equal to the traffic carried by current solution starting from which the restart procedure is started.

Then, in step 2920, a cell j is randomly extracted among the inactive cells in current solution, such cell being activated in step 2925.

In step 2930 the update of estimations associated with the updated solution is performed. Such operation is divided into a first sub-step 2935 for updating the Area Coperta Stimata, and a second sub-step 2940 for updating the Traffico Smaltito Stimato.

In step 2935 the updated value of Area Coperta Stimata is obtained from the sum of current parameter value and the area covered by the randomly extracted cell in the configuration with all active candidate cells.

In step 2940 the updated value of Traffico Smaltito Stimato is obtained from the sum of current parameter value and traffic carried by the randomly extracted cell in the configuration with all active candidate cells.

At the end of the update sub-steps of covered area and carried traffic estimations, in step 2945 the satisfaction of project constraints by the estimations associated with the obtained solution is checked. If the estimations are satisfied, the procedure advances to step 2950, otherwise it returns to step 2920 and performs a new random cell extraction.

In step 2950, performances of the set of cells obtained during the "restore" step are evaluated through the deterministic evaluation module 14.

Afterwards, in step 2955, the real satisfaction of project constraints by the obtained solution is checked. If the constraints are satisfied, the "restore" procedure ends, restarting the optimisation process. Otherwise, step 2960 is performed in which Area Coperta Stimata and Traffico Smaltito Stimato are updated with covered area and carried traffic that have been evaluated in step 2950 and then, after having completed the update, a random cell extraction is again performed in step 2920.

In case of site-based selection, the cell-based described operations for the algorithm restore procedure are performed on a site-base.

Concluding, the present invention advantageously allows, in its preferred embodiment, performing the planning of a third-generation network by selecting a set of sites within a wider set of candidate sites, guaranteeing a solution that is able to simultaneously comply with the project constraints on the globally covered area and on the globally carried traffic by selected sites, in addition to possible constraints referred to the searched optimum solution characteristics, such as for example the presence of compulsorily active cells and the need for simultaneously activating/deactivating all cells in a site.

The present invention further allows performing the planning of a network guaranteeing a correct and efficient operation of a mobile terminal during building the active set which lists the cells to which the terminal is connected in macrodiversity, because the pilot pollution phenomenon is also taken into account, operating in order to minimise it.

Obviously, the described methodology, that provides for subjecting to constraints both coverage and carried traffic, can be easily extended, by suitably adopting the parameters to be used in the cost function, for example, for planning cellular networks of the GSM or second-generation types, and anyway for planning networks in cases in which the use of a site selection method can be assumed.

The described method and system can be used, for example, for planning third-generation networks, both by a mature operator already present in the mobile telephones market, and therefore with an installed network, and by a new operator.

In fact, a pre-existing operator will have available a presumably high set of sites, at least for the first network development steps, and will have, as main objective, that of deciding how many and which base radio stations will have to be activated depending on the type and amount of traffic being present in the territory considered by planning. Should it be decided to use all potentially available (candidate) base radio stations, there would be the best possible result in terms of radio coverage and carried traffic, at the expense of a high cost of installed apparatuses and their bad use. In this case, the system would highly probably be characterised by the presence of many cells characterised by a low cell load level, namely with particularly low associated $\eta_{cell}$ and by a high pilot pollution incidence.

Lower costs with the same results, and therefore the same globally guaranteed radio coverage and carried traffic, could be obtained by not activating a certain number of cells (or sites), whose carried traffic in the network configuration with all active candidate cells could be "captured" by stations adjacent thereto, not deactivated, that would be consequently characterised by a better exploitation of available capability. In such a configuration, the system as a whole would better be used and therefore more efficient (in addition to being less costly).

A similar problem will occur in case of a new operator for which it is important to establish how many cells are necessary for a good system design and where they will have to be installed. In this type of context, undoubtedly different from the one of a operator that already has a second-generation mobile network, an efficient site selecting algorithm, operating on a set of points distributed on the territory in a relatively aimed way, can provide a valid support, in addition to the real step of planning the system, to the definition of the so-called site search areas, first major step in the radio designing process of a mobile cellular network.

Obviously, without changing the invention principle, the embodiments and the realisation parts can be widely changed with respect to what has been described and shown merely as a non-limiting example, without departing from the scope of the present invention as defined by the enclosed claims.

The invention claimed is:

1. A method for selecting a subset of sites within a whole set of candidate sites for activating one or more radio stations in a telecommunications network, comprising the steps of:
   building an initial solution comprising a subset of sites obtained by starting from a potential network configuration comprising as active the whole set of candidate sites, wherein the initial solution comprises compulsorily active cells corresponding to already active cells in the physical network; and
   optimising the initial solution by activating "inactive" sites and/or deactivating "active" sites, in order to minimise a predetermined cost function for the solution, wherein the predetermined cost function includes a term pointing out the presence of pilot pollution in the system, the term including a ratio between global traffic in pilot pollution associated with a set of active cells in an examined solution and maximum pilot pollution that can be found in the potential network configuration, and wherein at least one of the "active" sites is deactivated based on the term pointing out the presence of pilot pollution,
   said steps of building and optimising the initial solution being adapted to define solutions having a geographic coverage wider than a predefined minimum coverage area and being adapted to manage an amount of traffic greater than a predefined minimum value of expected traffic.

2. A processing system for selecting a subset of sites within a set of candidate sites for activating one or more radio stations of a telecommunications network, comprising one or more processing modules programmed for performing a site selecting method according to claim 1, and an associated module for evaluating the performance of the set of selected sites.

3. A non-transitory computer readable storage medium encoded with a computer program product or group of computer program products that can be loaded into a memory of at least one processing system and executed by the processing system, comprising one or more modules capable of performing a method according to claim 1 for selecting a subset of sites within a set of candidate sites for activating one or more radio stations in a telecommunications network.

4. A method for planning a telecommunications network comprising a plurality of radio stations sites, comprising a selection of sites from a set of candidate sites through a method according to claim 1.

5. A telecommunications network, comprising a plurality of radio stations sites selected from a set of candidate sites through a selection method according to claim 1.

6. The method according to claim 1, wherein the cost function of a solution is expressed as weighed sum of a plurality of cost items, comprising items representing:
   the ratio between geographic area not served by a subset of active sites and a served area in a potential network configuration;
   the ratio between traffic not carried by the subset of active sites and traffic carried in the potential network configuration;
   the mean square deviation of load cells of activated cells, from an ideal cell load; and
   the mean square deviation of soft hand-over loads of activated cells, from an ideal soft hand-over load.

7. The method according to claim 1, wherein said step of optimising comprises the steps of:
   i) generating a neighborhood of solutions of the current solution by activating "inactive" sites and/or by deactivating "active" sites;
   ii) computing a predetermined cost function of solutions belonging to the neighborhood and selecting a best solution of the neighborhood as current solution, depending on the respective cost values;
   iii) determining a set of solutions in a current solution neighborhood; and
   iv) iteratively applying steps i)-iii) until a predefined processing time is elapsed or until a solution whose cost is lower than a pre-determined value is obtained within said set of solutions and designating as final solution one among the obtained solutions within said set of solutions.

8. The method according to claim 7, comprising the steps of:
   verifying, upon each iteration, that in the set of solutions in the current solution neighborhood at least one solution has
      a geographic coverage area greater than the predefined minimum coverage area and is adapted to manage an amount of traffic greater than the predefined minimum value of expected traffic; or
      a coverage area with relaxed constraints within a predefined threshold and is adapted to manage an amount of traffic greater than the predefined minimum expected traffic value or is adapted to manage an amount of traffic with relaxed constraints within a predefined threshold and has a geographic coverage area greater than the predefined minimum coverage area; and in case such check is not satisfied for a predefined number of iterations, building a solution satisfying these conditions through a random activation of one or more cells/sites starting from the current solution and consequently returning to step i) of generating the neighborhood of solutions applied to a thereby built solution.

9. The method according to claim 7, wherein the step of generating a neighborhood of solutions comprises the steps of:

verifying the type of a predefined number of previous activation/deactivation moves; and building a solutions neighborhood through moves of the same type of said number of previous moves.

10. The method according to claim 9, wherein an activation move comprises the activation of a useful cell in order to remove coverage and/or traffic holes, or having a high adjacency parameter value in soft hand-over toward cells having high cell load values.

11. The method according to claim 9, wherein a deactivation move comprises the deactivation of a cell having a lower cell load and having a high adjacency parameter value in soft hand-over toward at least one active cell having a cell load value that is lower than a pre-established maximum value.

12. The method according to claim 9, wherein a deactivation move comprises deactivation of a cell having in soft hand-over adjacency at least one cell able to support the load and for which the ratio between carried traffic by current active cells and placed in pilot pollution by the cell under deactivation, and globally carried traffic by the cell under deactivation, is maximum.

13. The method according to claim 7, wherein the predefined minimum coverage area and the predefined minimum expected traffic are defined depending on the coverage area and traffic guaranteed by the potential network configuration.

14. The method according to claim 13, wherein solutions with relaxed constraints are allowed for which the coverage area and the amount of managed traffic related to the selected subset of sites are included within a relaxation threshold of the predefined requirements of minimum coverage area and minimum expected traffic.

15. The method according to claim 14, wherein the step of determining the set of neighborhood solutions comprises at least one of the following steps:

storing the best solution in terms of cost that shows a geographic coverage area that is greater than said minimum coverage area and is adapted to manage an amount of traffic that is greater than said minimum expected traffic value; and storing the best solution in terms of cost for which the coverage area and the amount of managed traffic are included within said relaxation threshold of predefined requirements of minimum coverage area and minimum expected traffic value; and storing the best solution in terms of cost that belongs to the solutions neighborhood.

16. The method according to claim 15, wherein a "restore" procedure is performed for a solution in case it is impossible to build a non-empty neighborhood of the current solution, in which the best stored solution during said iterations is "restored".

17. The method according to claim 15, wherein a "restore" procedure is performed for a solution in case it is impossible to build a non-empty neighborhood of the current solution, in which a random solution is built.

18. The method according to claim 1, wherein the initial solution comprises the cells belonging to a predefined list of compulsorily active cells and the cells deemed as "not able to be turned off" due to a higher cell load than a predefined threshold load in the potential network configuration.

19. The method according to claim 18, wherein, in case said initial solution does not have a coverage area that is greater than said minimum area and an amount of traffic that is greater than said minimum traffic value, said solution is enriched by additionally including the cells deemed in the "able to be turned off" status due to a lower cell load than a predefined threshold load in the potential network configuration, but not having in such configuration any adjacent cell in soft hand-over.

20. The method according to claim 19, wherein, in case said enriched initial solution does not have a coverage area that is greater than said minimum area and an amount of traffic that is greater than said minimum traffic value, and the average load of cells in the potential network configuration is greater than a predefined threshold load, said solution is further enriched by additionally including cells having a low load and candidate to "capture" the associated load to cells deemed in the "able to be turned off" status and having one or more adjacent cells in soft hand-over, in the potential network configuration.

21. The method according to claim 19, wherein, in case said enriched initial solution does not have a coverage area that is greater than said minimum area and an amount of traffic that is greater than said minimum traffic value, and the average load of cells in the potential network configuration is less than a predefined threshold load, said solution is further enriched by additionally including the most adjacent cells in soft hand-over candidate to "capture" the load associated with cells deemed in the "able to be turned off" status and having one or more adjacent cells in soft hand-over, in the potential network configuration.

22. The method according to claim 20, wherein, in case said further enriched initial solution does not have a coverage area that is greater than said minimum area and an amount of traffic that is greater than said minimum traffic value, the initial solution is built as solution that minimises the number of active cells among the obtained solutions, starting from the potential network configuration, by deactivating the cells:

having the lower sum of percentages of coverage area and carried traffic with respect to the total coverage area and carried traffic guaranteed by the potential network configuration, if, following such deactivation, the remaining coverage area and carried traffic are greater than their respective predefined minimum values; or having the lowest coverage area, if, following such deactivation, the remaining coverage area is greater than the predefined minimum area, among a list of cells with which the minimum carried traffic is associated, if, following such deactivation, the remaining carried traffic is greater than the predefined minimum traffic value; or with which the lowest carried traffic is associated, if, following such deactivation, the remaining carried traffic is greater than the predefined minimum traffic value, among a list of cells having the lowest coverage area, if, following such deactivation, the remaining coverage area is greater than the predefined minimum area.

23. The method according to claim 21, wherein, in case said further enriched initial solution does not have a coverage area that is greater than said minimum area and an amount of traffic that is greater than said minimum traffic value, the initial solution is built as solution that minimises the number of active cells among the obtained solutions, starting from the potential network configuration, by deactivating the cells:

having the lower sum of percentages of coverage area and carried traffic with respect to the total coverage area and carried traffic guaranteed by the potential network configuration, if, following such deactivation, the remaining coverage area and carried traffic are greater than their respective predefined minimum values; or having the lowest coverage area, if, following such deactivation, the remaining coverage area is greater than the predefined minimum area, among a list of cells with which the minimum carried traffic is associated, if, following such deactivation, the remaining carried traffic is greater than the predefined minimum traffic value; or with which the lowest carried traffic is associated, if, following such deactivation, the remaining carried traffic is greater than the predefined minimum traffic value, among a list of cells having the lowest coverage area, if, following such deactivation, the remaining coverage area is greater than the predefined minimum area.

* * * * *